(12) United States Patent
Natan et al.

(10) Patent No.: US 7,236,949 B2
(45) Date of Patent: Jun. 26, 2007

(54) COMPUTER IMPLEMENTED SYSTEM FOR ESTIMATING THE DEMAND DEPENDENT UNIT STOCKOUT COST OF A CONSUMER ITEM AT A LOCATION OF A SINGLE PEROID INVENTORY SYSTEM, STOCKOUT COST APPLICATION THEREFOR, AND METHOD THEREFOR

(75) Inventors: Ofra Natan, Ramat Gan (IL); Michael Aronowich, Haifa (IL); Sofia Mariamova, Ashdod (IL); Henry Harel, Tel Aviv (IL)

(73) Assignee: Demantra Ltd, Ramat Gan (IL)

( * ) Notice: Subject to any disclaimer, the term of this patent is extended or adjusted under 35 U.S.C. 154(b) by 804 days.

(21) Appl. No.: 10/227,536

(22) Filed: Aug. 26, 2002

(65) Prior Publication Data

US 2004/0039664 A1     Feb. 26, 2004

(51) Int. Cl.
*G06Q 10/00*     (2006.01)
(52) U.S. Cl. ............................ 705/28; 705/10
(58) Field of Classification Search ............... 705/28, 705/22, 7, 8, 10
See application file for complete search history.

(56) References Cited

U.S. PATENT DOCUMENTS

| 5,299,115 | A | 3/1994 | Fields et al. |
| 5,521,813 | A | 5/1996 | Fox et al. |
| 5,526,257 | A | 6/1996 | Lerner |
| 5,608,621 | A | 3/1997 | Caveney et al. |
| 5,712,985 | A | 1/1998 | Lee et al. |
| 5,832,456 | A | 11/1998 | Fox et al. |
| 5,953,707 | A | 9/1999 | Huang et al. |
| 5,963,919 | A | 10/1999 | Brinkley et al. |
| 5,999,908 | A | 12/1999 | Abelow |
| 6,026,370 | A | 2/2000 | Jermyn |
| 6,029,139 | A | 2/2000 | Cunningham et al. |
| 6,032,125 | A | 2/2000 | Ando |
| 6,151,582 | A | 11/2000 | Huang et al. |
| 6,188,989 | B1 | 2/2001 | Kennedy |
| 6,205,431 | B1 | 3/2001 | Willemain et al. |
| 6,249,774 | B1 | 6/2001 | Roden et al. |
| 6,253,187 | B1 | 6/2001 | Fox |
| 6,341,269 | B1 | 1/2002 | Dulaney et al. |
| 2001/0020230 | A1 | 9/2001 | Kaneko et al. |

OTHER PUBLICATIONS

K.A. Artto, E. Pylkkanen; An effective procedure for the distribution of magazines; Int'l: Trans. In Op. Res. 6 (1999) 289-310.
PC Bell-Richard Ivey School of Business; Forecasting demand variation when there are stockouts; Journal of the Operational Research Society 2000; 51: pp. 358-363.
William E. Wecker; Predicting Demand from Sales Data in the Presence of Stockouts; Management Science, vol. 24, No. 10 Jun. 1978; pp. 1043-1054.

(Continued)

*Primary Examiner*—Ronald Laneau (57) ABSTRACT

Computer implemented system for estimating the demand dependent unit stockout cost $b_{ij}=b(\lambda_{ij})$ of an $i^{th}$ consumer item at a $j^{th}$ location of a single period inventory system as a function of its unit retail price $p_{ij}$, its unit production cost $c_{ij}$, its unit return cost $g_{ij}$ and its mean demand $\lambda_{ij}$, stockout cost application therefor, and method therefor.

9 Claims, 4 Drawing Sheets

OTHER PUBLICATIONS

Peter C. Bell; Adaptive Sales Forcasting with Many Stockouts; J. Op. Res. Soc. 1981; vol. 32, pp. 865 to 873.
Peter C. Bell; A New Procedure for the Distribution of Periodicals; J. Opl. Res. Soc. 1978; vol. 29, 5, pp. 427-434.

Walter Zinn & Peter C. Liu, *Consumer Respons to Retail Stockouts*, 22(1) Journal of Business Logistics 49, (2001).

Walter Zinn & Peter C. Liu, *Consumer Response to Retail Stockouts*, 22(1) Journal of Business Logistics 49, (2001).

COMPUTER IMPLEMENTED SYSTEM FOR ESTIMATING THE DEMAND DEPENDENT UNIT STOCKOUT COST OF A CONSUMER ITEM AT A LOCATION OF A SINGLE PEROID INVENTORY SYSTEM, STOCKOUT COST APPLICATION THEREFOR, AND METHOD THEREFOR

FIELD OF THE INVENTION

The invention relates to estimating the unit stockout cost of a consumer item at a location of a single period inventory system.

GLOSSARY OF TERMS

The following alphabetically listed terms together with their acronyms are employed in the description and claims of this application with respect to the present invention:

Availability $A_{ij}$, Optimal Availability $A_{ij}^*$, and Optimal Availability Matrix $A^*$ Availability $A_{ij}$ is an industry term referring to the probability of completely satisfying the demand for an $i^{th}$ consumer item where i=1, 2, ..., m at a $j^{th}$ location where j=1, 2, ..., n of a single period inventory system without an occurrence of a sellout due to insufficient draw at that location. In mathematical terms, $A_{ij}=F(\lambda_{ij},D_{ij})$ where F is the cumulative probability distribution function (cdf) of demand for the $i^{th}$ consumer item at the $j^{th}$ location, and $\lambda_{ij}$ and $D_{ij}$ are its mean demand and draw, respectively. The probability distribution function in the discrete case and the probability density function in the continuous case are both denoted by the letter "f". The optimal availability $A_{ij}^*$ of an $i^{th}$ consumer item at a $j^{th}$ location of a single period inventory system is a function of its unit retail price $p_{ij}$, its unit production cost $c_{ij}$, its unit return cost $g_{ij}$, and its unit stockout cost $b_{ij}$ and is that availability which maximizes the expected total profit realizable for that $i^{th}$ $j^{th}$ item-location of the single period inventory system. A unit return cost $g_{ij}$ is the difference between the expenses incurred upon returning a unit and its salvage value, and consequently it may assume either a positive or negative value. An optimal availability matrix $A^*$ is the matrix of optimal availabilities $A_{ij}^*$ for a single period inventory system, and degenerates to a single so-called optimal common availability $A^*$ in the case that the respective values of $p_{ij}$, $c_{ij}$, $g_{ij}$ and $b_{ij}$ are the same for all its $i^{th}$ $j^{th}$ item-locations.

Demand $X_{ij}$, and Mean Demand $\lambda_{ij}$

The demand process for a perishable consumer item at a location has a random but non-stationary nature, and therefore cannot be subjected to ensemble inferences based on a single realization. Mean demands $\lambda_{ij}$ for a consumer item at a location over time are presupposed to be the outcome of a stochastic process which can be simulated by a forecast model whilst the demand $X_{ij}$ for an $i^{th}$ consumer item at a $j^{th}$ location of a single period inventory system at a future point in time is a random variable with a conditional probability distribution conditioned on its mean demand $\lambda_{ij}$ at that point in time.

Distribution Policy

A distribution policy is the delivered quantities of each $i^{th}$ consumer item where i=1, 2, ..., m at each $j^{th}$ location where j=1, 2, ..., n of a single period inventory system in accordance with a predetermined business strategy. The most profitable distribution policy for a single period inventory system is realized by an optimal draw matrix $D^*$.

Draw $D_{ij}$, Draw Matrix D, and Optimal Draw Matrix $D^*$

Draw $D_{ij}$ is an industry term referring to the delivered quantity of an $i^{th}$ consumer item where i=1, 2, ..., m at a $j^{th}$ location where j=1, 2, ..., n of a single period inventory system. A draw matrix D is the matrix of draws $D_{ij}$ for all $i^{th}$ $j^{th}$ item-locations of a single period inventory system. The optimal draw matrix $D^*$ for a single period inventory system is the draw matrix maximizing the expected total profit realizable by a distribution policy therefor.

Returns $R(\lambda_{ij},D_{ij})$, and Conditional Expected Returns CER$(\lambda_{ij},D_{ij})$ Returns $R(\lambda_{ij},D_{ij})$ is an industry term referring to the number of unsold units of an $i^{th}$ consumer item at a $j^{th}$ location of a single period inventory system, and is given by $R(\lambda_{ij},D_{ij})=\max(D_{ij}-X_{ij},0)$ where $D_{ij}$, $X_{ij}$, and $\lambda_{ij}$ are its draw, demand, and mean demand, respectively, at that location. The conditional expected returns CER$(\lambda_{ij},D_{ij})$ of the $i^{th}$ $j^{th}$ item-location of a single period inventory system conditioned on an occurrence of the return of at least one unit of the $i^{th}$ item at that location is given by:

$$CER(\lambda_{ij},D_{ij})=E[R(\lambda_{ij},D_{ij})|X_{ij}<D_{ij}]=ER(\lambda_{ij},D_{ij})/F(\lambda_{ij},D_{ij})$$

where ER$(\lambda_{ij},D_{ij})$ is the expected value of $R(\lambda_{ij},D_{ij})$, and F is the cumulative probability distribution function (cdf) of the probability distribution of the demand for the $i^{th}$ $j^{th}$ item-location. For a Poisson distribution of demand, $$ER(\lambda_{ij},D_{ij})=D_{ij}f(\lambda_{ij},D_{ij}-1)+(D_{ij}-\lambda_{ij})F(\lambda_{ij},D_{ij}-2).$$

Sales $S(\lambda_{ij},D_{ij})$

Sales $S(\lambda_{ij},D_{ij})$ refers to the quantity of sold items of an $i^{th}$ consumer item at a $j^{th}$ location of a single period inventory system as upper bounded by the draw $D_{ij}$ at that location at each point in time, and is given by $S(\lambda_{ij},D_{ij})=\min(D_{ij},X_{ij})=D_{ij}-R(\lambda_{ij},D_{ij})$, where $D_{ij}$, $X_{ij}$, and $\lambda_{ij}$ are its draw, demand, and mean demand, respectively, at that location.

Single Period Inventory Systems

Single period inventory systems are largely concerned with consumer items having a limited shelf life at the end of which an item loses most, if not all, of its consumer value, and the stock of which at a $j^{th}$ location is not replenished to prevent an occurrence of a sellout. Such consumer items can include perishable goods, for example, fruit, vegetables, flowers, and the like, and fixed lifetime goods, for example, printed media publications, namely, daily newspapers, weeklies, monthlies, and the like. Two common degenerate problems of single period inventory systems are known in the industry as the so-called "newsvendor" problem i.e. the sale of the same item throughout a multi-location single period inventory system and the so-called "knapsack" problem i.e. the sale of different items at the same location.

Stockout $ST(\lambda_{ij},D_{ij})$, and Conditional Expected Stockout EST$(\lambda_{ij},D_{ij})$ Stockout $ST(\lambda_{ij},D_{ij})$ is the quantity of unsatisfied demand for an $i^{th}$ consumer item at a $j^{th}$ location of a single period inventory system, and is given by $ST(\lambda_{ij},D_{ij})=\max(X_{ij}-D_{ij},0)=X_{ij}-S(\lambda_{ij},D_{ij})$ where $D_{ij}$, $X_{ij}$, and $\lambda_{ij}$ are its draw, demand, and mean demand, respectively, at that location. The conditional expected stockout CEST$(\lambda_{ij},D_{ij})$ of the $i^{th}$ $j^{th}$ item-location of a single period inventory system conditioned on an occurrence of a sellout of the $i^{th}$ item at the $j^{th}$ location is given by:

$$CEST(\lambda_{ij},D_{ij})=E[ST(\lambda_{ij},D_{ij})|X_{ij}>D_{ij}]=EST(\lambda_{ij},D_{ij})/(1-F(\lambda_{ij},D_{ij}))$$

where $EST(\lambda_{ij},D_{ij})=\lambda_{ij}-ES(\lambda_{ij},D_{ij})$ is the expected value of $ST(\lambda_{ij},D_{ij})$, and F is the cumulative probability distribution function (cdf) of the probability distribution of the demand for the $i^{th}$ $j^{th}$ item-location.

BACKGROUND OF THE INVENTION

One computer implemented approach for calculating a demand forecast involves defining a so-called demand forecast tree capable of being graphically represented by a single top level node with at least two branches directly emanating therefrom, each branch having at least one further node. The demand forecast is computed on the basis of historical sales data typically associated with bottom level nodes of a demand forecast tree by a forecast engine capable of determining a mathematical simulation model for a demand process. One such forecast engine employing statistical seasonal causal time series models of count data is commercially available from Demantra Ltd, Israel, under the name Demantra™ Demand Planner.

Demand forecast applications include determining an optimal draw matrix D* specifying the number of copies of different consumer items to be delivered to each location of a multi-location single period inventory system to maximize the expected total profit (ETP) realizable by a distribution policy therefor in accordance with the expression:

$$ETP = \sum_{ij} EP_{ij} \qquad \text{Eqn. (1)}$$

$$= \sum_{ij} [(p_{ij} - c_{ij})D_{ij} - (p_{ij} - g_{ij})ER(\lambda_{ij}, D_{ij}) - b_{ij}EST(\lambda_{ij}, D_{ij})]$$

where $p_{ij}$ is the unit retail price of an $i^{th}$ consumer item at a $j^{th}$ location, $c_{ij}$ is its unit production cost, $g_{ij}$ is its unit return cost when unsold, and $b_{ij}$ is its unit stockout cost. Derived from Eqn. (1), the optimal draw matrix D* for the most profitable distribution policy for a single period inventory system is calculated using optimal availabilities $A_{ij}^*$ where:

$$A_{ij}^* = F(\lambda_{ij}, D_{ij}^*) = \frac{p_{ij} - c_{ij} + b_{ij}}{p_{ij} - g_{ij} + b_{ij}} \qquad \text{Eqn. (2)}$$

The unit retail price $p_{ij}$ of an $i^{th}$ consumer item at a $j^{th}$ location, its unit production cost $c_{ij}$, and its unit return cost $g_{ij}$ are tangible costs whilst its unit stockout cost $b_{ij}$ reflects both tangible and intangible pecuniary considerations due to the lost sale of a unit such as loss of potential profit, customer goodwill, and the like. The unit stockout cost $b_{ij}$ of an $i^{th}$ consumer item at a $j^{th}$ location of a single period inventory system is often estimated to be the unit profit $p_{ij}-c_{ij}$, however, this approach often renders an optimal availability $A_{ij}^*$ incompatible with an industry accepted availability therefor denoted $A_{ij}^I$, thereby implying that the unit stockout cost $b_{ij}$ is, in fact, different than the unit profit $p_j-c_j$.

This is now exemplified for a single period inventory system for delivering newspapers for which typical unit cost values are as follows: $p_j$=US$0.50, $b_j$=$c_j$=US$0.25, and $g_j$=US$0.00 for all locations j. On the assumption that unit stockout cost $b_j$ equals unit profit $p_j-c_j$, this leads to an optimal common availability A*=66.7% using Eqn. (2). Against this, the industry accepted availability $A_{ij}^I$ for a single period inventory system for delivering newspaper is 80%±5%. The discrepancy between these availabilities implies that for the same $j^{th}$ location with mean demand $\lambda$=20, the draw $D_j$ thereat would be 21 in accordance with the optimal common availability A*=66.7% and as high as 24 corresponding to $A^I$=84.3%.

SUMMARY OF THE INVENTION

Broadly speaking, the present invention provides a novel computer implemented system for realistically estimating the demand dependent unit stockout cost $b_{ij}=b(\lambda_{ij})$ (hereinafter shortened to "unit stockout cost $b_{ij}$") of an $i^{th}$ consumer item at a $j^{th}$ location of a single period inventory system as a function of its associated mean demand $\lambda_{ij}$ as opposed to the hitherto accepted approach of regarding the unit stockout cost of an item largely as a tangible cost with a fixed value, stockout cost application therefor, and method therefor. The present invention is based on the notion that a realistic estimate of the unit stockout cost $b_{ij}$ of the $i^{th}$ consumer item at the $j^{th}$ location of a single period inventory system is that which substantially balances the cost of its conditional expected stockout at the $j^{th}$ location with the cost of its conditional expected returns therefrom. It is believed that the realistic estimation of the unit stockout cost $b_{ij}$ of an $i^{th}$ consumer item at a $j^{th}$ location of a single period inventory system in accordance with the present invention will facilitate the determination of a more accurate and profitable distribution policy for a single period inventory system irrespective of whether it is or isn't subject to a constraint.

The approach for realistically estimating the unit stockout cost $b_{ij}$ of an $i^{th}$ consumer item at a $j^{th}$ location of a single period inventory system in accordance with the present invention can be readily degenerated to estimate the unit stockout cost $b_i$ where i=1, 2, . . . , m in the case of the so-called "knapsack" problem, namely, the sale of different items at the same location, and unit stockout cost $b_j$ where j=1, 2, . . . , n in the case of the so-called "newsvendor" problem, namely, the sale of the same item at different locations.

BRIEF DESCRIPTION OF THE DRAWINGS

In order to better understand the invention and to see how it can be carried out in practice, a preferred embodiment will now be described, by way of a non-limiting example only, with reference to the accompanying drawings in which.

DETAILED DESCRIPTION OF THE PREFERRED EMBODIMENT

Figure 1:
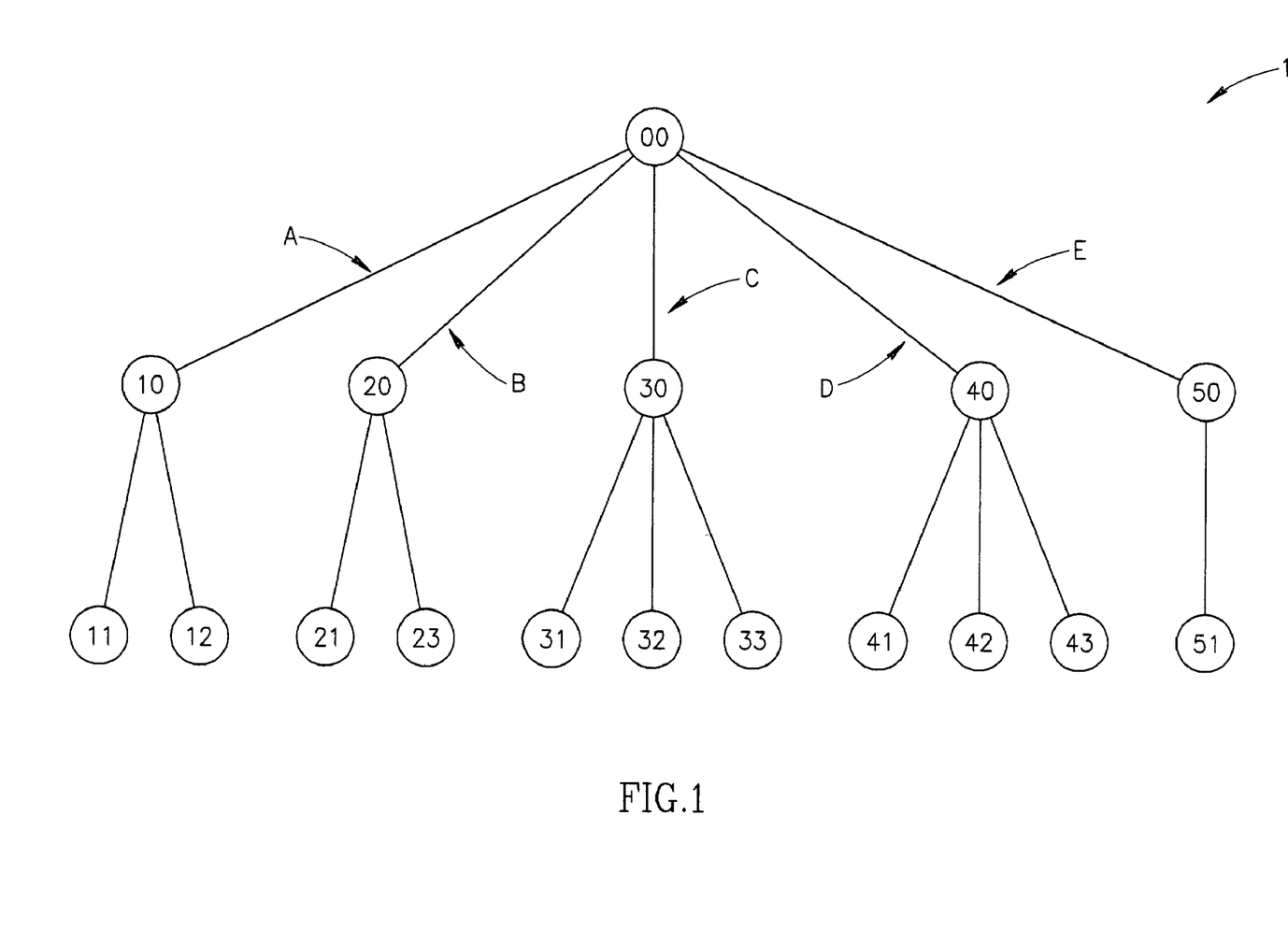
FIG. 1 is a pictorial representation showing a demand forecast tree for calculating demand forecast information for five different consumer items.
Figure 2:
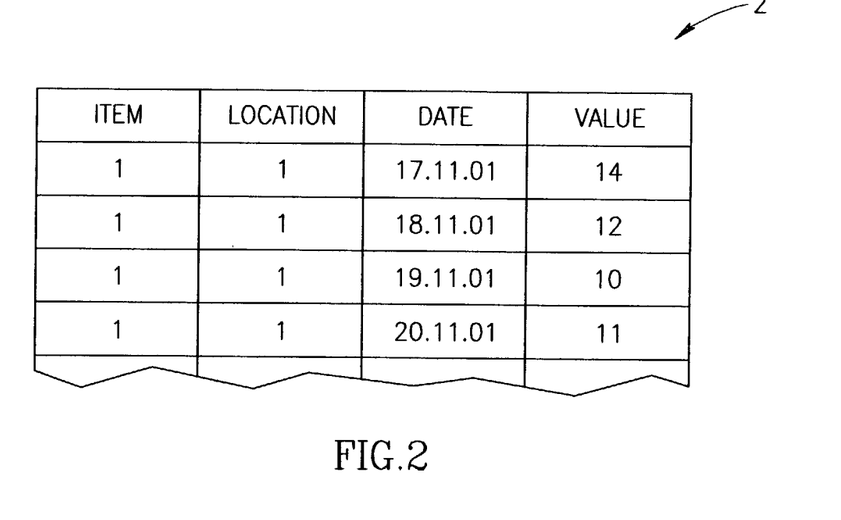
FIG. 2 is a table showing historical sales data associated with the demand forecast tree of FIG. 1.

FIG. 1 shows an exemplary demand forecast tree 1 having a single top level node (00) with five branches A, B, C, D and E for correspondingly representing the sale of Item I (top level-1 node (10)) at Locations 1 and 2 (bottom level nodes (11) and (21)), Item II (top level-1 node (20)) at Locations 1 and 3 (bottom level nodes (21) and (23)), Item III (top level-1 node (30)) at Location 1, 2 and 3 (bottom level nodes (31), (32) and (33)), Item IV (top level-1 node (40)) also at Locations 1, 2 and 3 (bottom level nodes (41), (42) and (43)); and Item V (top level-1 node (50)) at Location 1 (bottom level node (51)) only. FIG. 2 shows an exemplary table 2 containing historical sales data for Item I at the bottom level nodes (11) and (12). Similar tables exist for the sale of the other items at their respective locations.

Figure 3:
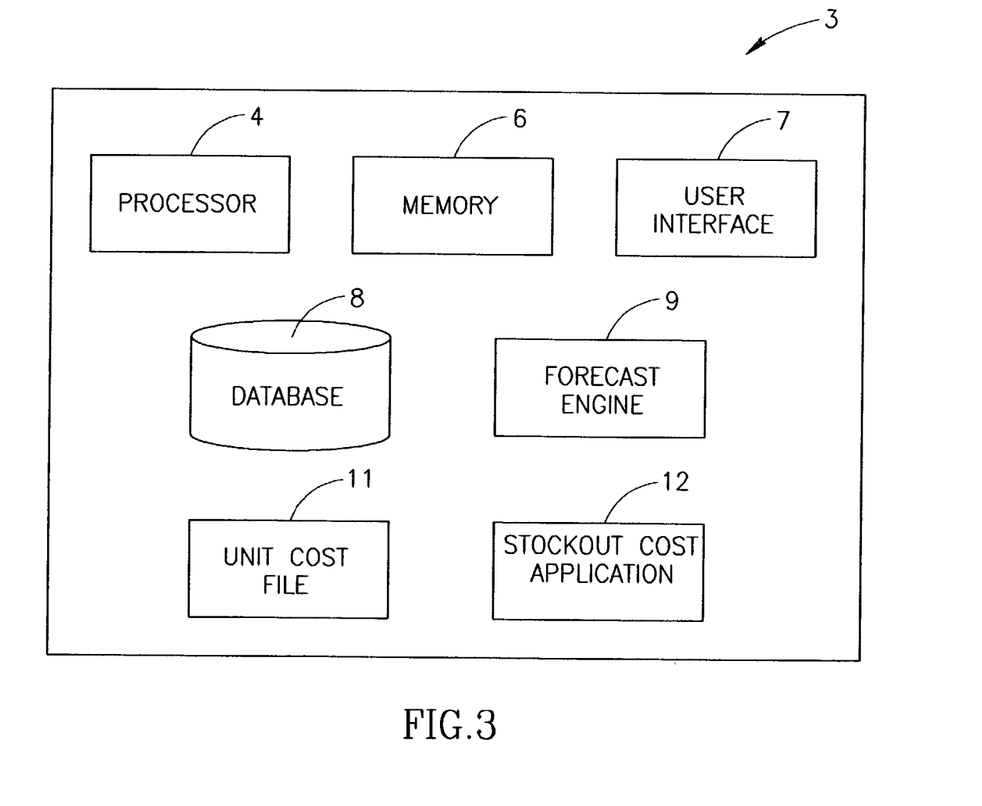
FIG. 3 is a block diagram of a computer implemented system for estimating the unit stockout cost $b_{ij}$ of an $i^{th}$ consumer item at a $j^{th}$ location of a single period inventory system.

FIG. 3 shows a computer implemented system 3 with a processor 4, memory 6, a user interface 7 including suitable input devices, for example, a keypad, a mouse, and the like, and output means, for example, a screen, a printer, and the like, with possibly other computer components for enabling operation of the system including result analysis. The computer implemented system 3 also includes a database 8 for storing historical time series of sales information of items at locations, a forecast engine 9 for forecasting the mean demand $\lambda_{ij}$ for each $i^{th}$ consumer item at each $j^{th}$ location of a single period inventory system on the basis of the historical sales data, a unit cost file 11 for storing the unit retail price $p_{ij}$, the unit production cost $c_{ij}$, and the unit return cost $g_{ij}$, of each $i^{th}$ consumer item at each $j^{th}$ location of the single period inventory system; and a stockout cost application 12 for estimating the demand dependent unit stockout cost $b_{ij}$ of an $i^{th}$ consumer item at a $j^{th}$ location of a single period inventory system as a function of its unit retail price $p_{ij}$, its unit production cost $c_{ij}$, its unit return cost $g_{ij}$ and its mean demand $\lambda_{ij}$. The forecast engine 9 may be implemented and managed as illustrated and described in commonly assigned co-pending U.S. patent application Ser. No. 10/058,830 entitled "Computer Implemented Method and System for Demand Forecast Applications", the contents are which are incorporated herein by reference. Whilst the present invention is being described in the context of a fully functional computer implemented system, it is capable of being distributed as a program product in a variety of forms, and the present invention applies equally regardless of the particular type of signal bearing media used to carry out distribution. Examples of such media include recordable type media e.g. CD ROM and transmission type media e.g. digital communication links.

Figure 4:
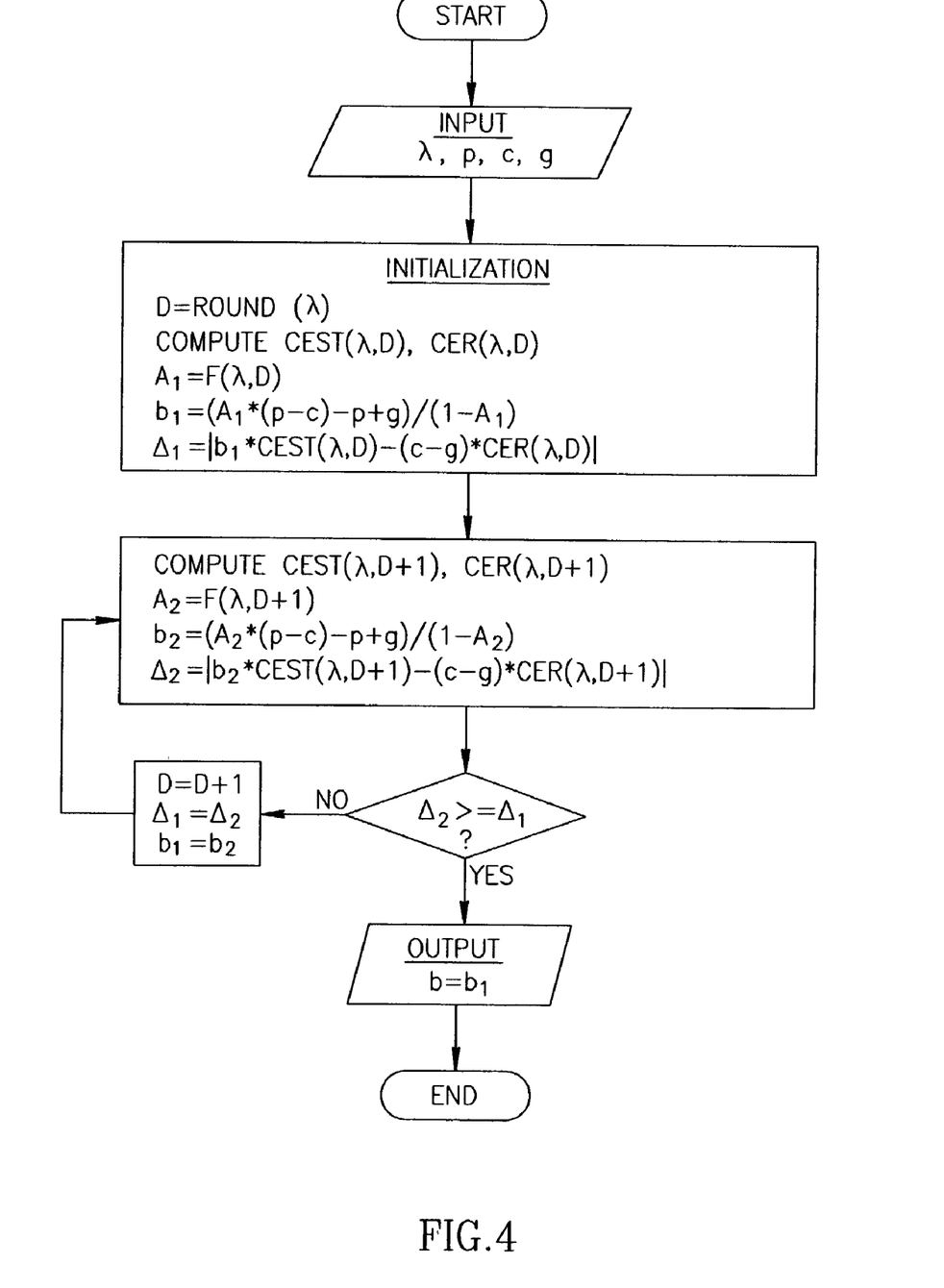
FIG. 4 is a flow chart of a method for estimating the unit stockout cost $b_{ij}$ of an $i^{th}$ consumer item at a $j^{th}$ location of a single period inventory system.
Figure 5:
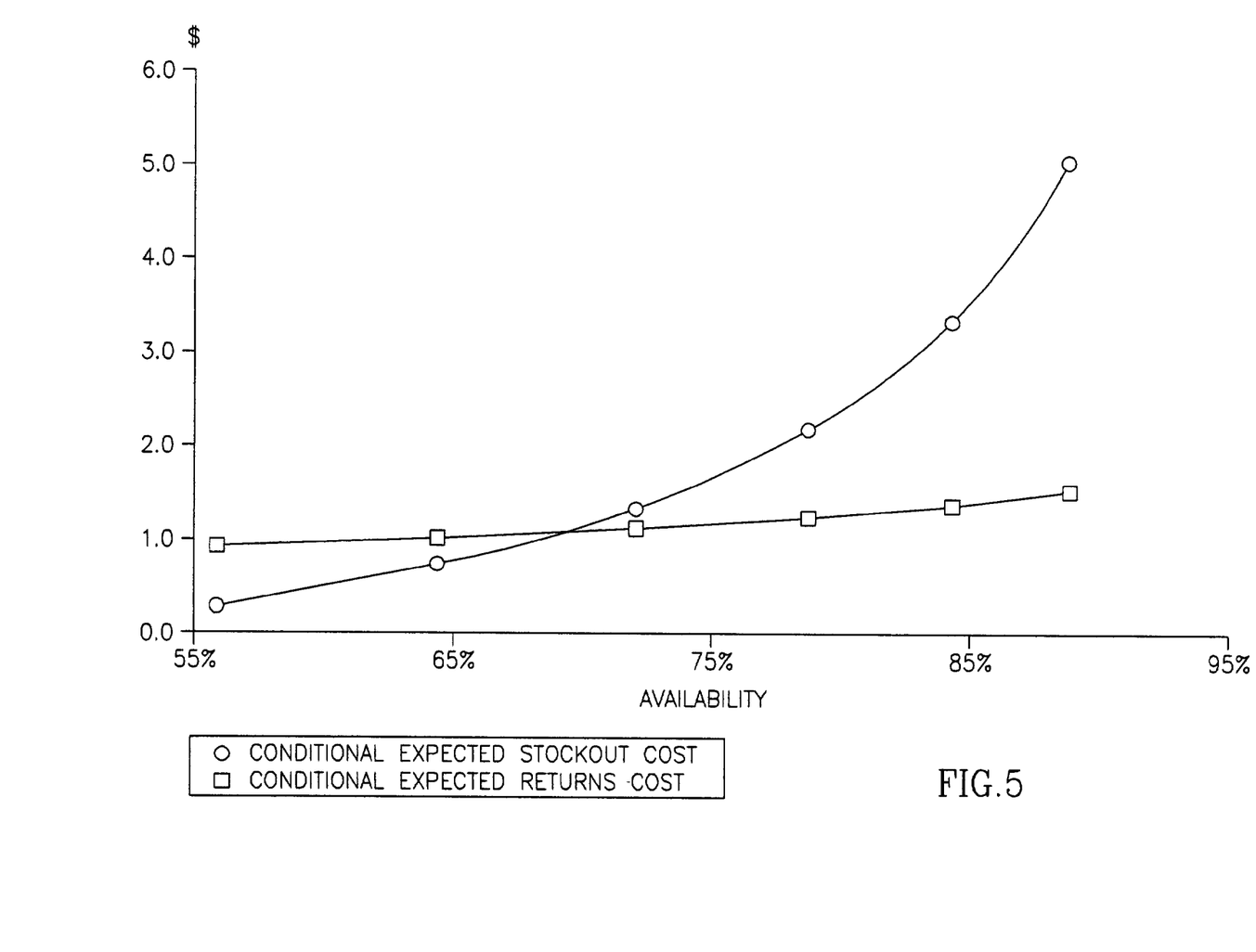
FIG. 5 is a graph plotting the conditional expected stockout cost and conditional expected returns cost against availability in the case that the unit cost values $p_j$=US$0.50, $c_j$=US$0.25, and $g_j$=US$0.00, and the mean demand $\lambda_j$=20.

With reference to FIGS. 4 and 5, the present invention will now be exemplified with respect to the single period inventory system at a given location, described hereinabove in the Background of the Invention with the unit cost values p=US$0.50, c=US$0.25, and g=US$0.00, and the assumed Poisson distribution of demand with mean $\lambda_j$=20. The stockout cost application 12 calculates the values of the conditional expected stockout CEST($\lambda$,D) and the conditional expected returns CER($\lambda$,D) for an initial value of D which is typically the mean demand $\lambda$. In the case of a Poisson distribution, ER($\lambda$,D)=Df($\lambda$,D-1)+(D-$\lambda$)F($\lambda$,D-2). The stockout cost application 12 calculates the value of A, and then using the Eqn. (2), calculates the value of the unit stockout cost $b_j$ before calculating the absolute difference $\Delta$ between the conditional expected stockout cost bCEST($\lambda$,D), and the conditional expected returns cost 0.25CER($\lambda$,D). The stockout cost application 12 repeats these calculations for increasing values of D in increments of 1 up to 25 as shown in the following table with their respective conditional expected stockout costs and conditional expected returns costs being plotted against availability in FIG. 5:

|   | D  | CEST ($\lambda$,D) | CER ($\lambda$,D) | A     | b      | $\Delta$=\|bCEST ($\lambda$,D)- 0.25 CER ($\lambda$,D)\| |
|---|----|--------------------|-------------------|-------|--------|-----------------------------------|
| 1 | 20 | 4.0                | 3.778             | 55.91 | 0.067  | 0.7                               |
| 2 | 21 | 3.7                | 4.178             | 64.37 | 0.2017 | 0.3                               |
| 3 | 22 | 3.5                | 4.628             | 72.06 | 0.3948 | 0.2                               |
| 4 | 23 | 3.3                | 5.1348            | 78.75 | 0.6764 | 0.9                               |
| 5 | 24 | 3.1                | 5.6984            | 84.32 | 1.0947 | 2.0                               |
| 6 | 25 | 3.0                | 6.322             | 88.78 | 1.7285 | 3.5                               |

The stockout cost application 12 determines that the absolute difference $\Delta$ between the two opposing costs bCEST($\lambda$,D) and (c-g)CER($\lambda$,D) reaches its minimal value 0.2 at D=22 at an optimal availability A*=72.06% which is slightly greater than the availability which would equalize the two opposing costs at their cross over point on FIG. 5. This availability lies approximately midway between the hitherto calculated optimal availability A*=66.7% based on the assumption that stockout cost equals unit profit, and the industry accepted availability A'=80%±5%, and accordingly, yields the unit stockout cost US$0.3948 which is over 50% greater than the hitherto estimated unit profit US$0.50−US$0.25=US$0.25.

While the invention has been described with respect to a limited number of embodiments, it will be appreciated that many variations, modifications, and other applications of the invention can be made within the scope of the appended claims.

The invention claimed is:

1. Computer implemented system for estimating the demand dependent unit stockout cost $b_{ij}$=b($\lambda_{ij}$) of an $i^{th}$ consumer item at a $j^{th}$ location of a single period inventory system, the system comprising:
    (a) a database for storing historical sales data of sales information of at least the $i^{th}$ consumer item where i=1, 2, . . . , m at at least the $j^{th}$ location where j=1, 2, . . . , n of the single period inventory system;
    (b) a forecast engine for forecasting the mean demand $\lambda_{ij}$ of at least the $i^{th}$ consumer item at at least the $j^{th}$ location of the single period inventory system on the basis of the historical sales data;
    (c) a unit cost file for storing the unit retail price $p_{ij}$, the unit production cost $c_{ij}$, and the unit return cost $g_{ij}$ of at least the $i^{th}$ consumer item at at least the $j^{th}$ location of the single period inventory system; and
    (d) a stockout cost application for estimating the demand dependent unit stockout cost $b_{ij}$=b($\lambda_{ij}$) of the $i^{th}$ consumer item at the $j^{th}$ location of the single period inventory system as a function of its associated $p_{ij}$, $c_{ij}$, $g_{ij}$, and $\lambda_{ij}$ wherein said stockout cost application minimizes \|$b_{ij}$CEST($\lambda_{ij}$,$D_{ij}$)−($c_{ij}$−$g_{ij}$)CER($\lambda_{ij}$,$D_{ij}$)\| for determining the demand dependent unit stockout cost $b_{ij}$=b($\lambda_{ij}$) of the $i^{th}$ consumer item at the $j^{th}$ location of the single period inventory system.

2. The system according to claim 1 wherein said stockout cost application determines the demand dependent unit stockout cost $b_{ij}=b(\lambda_{ij})$ of the $i^{th}$ consumer item at the $j^{th}$ location of the single period inventory system to substantially balance the cost of its conditional expected stockout $b_{ij}\text{CEST}(\lambda_{ij},D_{ij})$ thereat, and the cost of its conditional expected returns $(c_{ij}-g_{ij})\text{CER}(\lambda_{ij},D_{ij})$ therefrom.

3. The system according to claim 1 wherein the consumer item is a printed media publication.

4. A computer readable storage medium on which a stockout cost application is store, which is capable of operating on at least one computer, and which is capable of estimating the demand dependent unit stockout cost $b_{ij}=b(\lambda_{ij})$ of an $i^{th}$ consumer item at a $j^{th}$ location of a single period inventory system wherein the stockout cost application is operable to: receive the unit retail price $p_{ij}$, the unit production cost $c_{ij}$, the unit return cost $g_{ij}$, and the mean demand $\lambda_{ij}$ of the $i^{th}$ consumer item at the $j^{th}$ location of the single period inventory system; and estimate the demand dependent unit stockout cost $b_{ij}=b(\lambda_{ij})$ of the $i^{th}$ consumer item at the $j^{th}$ location of the single period inventory system as a function of its associated $p_{ij}$, $c_{ij}$, $g_{ij}$, and $\lambda_{ij}$ wherein said stockout cost application minimizes $|b_{ij}\text{CEST}(\lambda_{ij},D_{ij})-(c_{ij}-g_{ij})\text{CER}(\lambda_{ij},D_{ij})|$ for determining the demand dependent unit stockout cost $b_{ij}=b(\lambda_{ij})$ of the $i^{th}$ consumer item at the $j^{th}$ location of the single period inventory system.

5. The stockout cost application according to claim 4 and operable to determine the demand dependent unit stockout cost $b_{ij}=b(\lambda_{ij})$ of the $i^{th}$ consumer item at the $j^{th}$ location of the single period inventory system to substantially balance the cost of its conditional expected stockout $b_{ij}\text{CEST}(\lambda_{ij},D_{ij})$ thereat, and the cost of its conditional expected returns $(c_{ij}-g_{ij})\text{CER}(\lambda_{ij},D_{ij})$ therefrom.

6. The stockout cost application according to claim 4 wherein the consumer item is a printed media publication.

7. Computer implemented method for estimating the demand dependent unit stockout cost $b_{ij}=b(\lambda_{ij})$ of an $i^{th}$ consumer item at a $j^{th}$ location of a single period inventory system, the method comprising the steps of:

(a) storing historical sales data of the sales information of at least the $i^{th}$ consumer item where i=1, 2, . . . , m at at least the $j^{th}$ location where j=1, 2, . . . , n of the single period inventory system;

(b) forecasting the mean demand $\lambda_{ij}$ of at least the $i^{th}$ consumer item at at least the $j^{th}$ location of the single period inventory system on the basis of the historical sales data;

(c) receiving the unit retail price $p_{ij}$, the unit production cost $c_{ij}$, and the unit return cost $g_{ij}$, of at least the $i^{th}$ consumer item at at least the $j^{th}$ location of the single period inventory system;

(d) estimating the demand dependent unit stockout cost $b_{ij}=b(\lambda_{ij})$ of the $i^{th}$ consumer item at the $j^{th}$ location of the single period inventory system as a function of its associated $p_{ij}$, $c_{ij}$, $g_{ij}$, and $\lambda_{ij}$ wherein said stockout cost application minimizes $|b_{ij}\text{CEST}(\lambda_{ij},D_{ij})-(c_{ij}-g_{ij})\text{CER}(\lambda_{ij},D_{ij})|$ for determining the demand dependent unit stockout cost $b_{ij}=b(\lambda_{ij})$ of the $i^{th}$ consumer item at the $j^{th}$ location of the single period inventory system; and (e) communicating the demand dependent unit stockout cost $b_{ij}=b(\lambda_{ij})$ of the $i^{th}$ consumer item at the $j^{th}$ location of the single period inventory system.

8. The method according to claim 7 wherein step (d) includes determining the demand dependent unit stockout cost $b_{ij}=b(\lambda_{ij})$ of the $i^{th}$ consumer item at the $j^{th}$ location of the single period inventory system to substantially balance the cost of its conditional expected stockout $b_{ij}\text{CEST}(\lambda_{ij},D_{ij})$ thereat, and the cost of its conditional expected returns $(c_{ij}-g_{ij})\text{CER}(\lambda_{ij},D_{ij})$ therefrom.

9. The method according to claim 7 wherein the consumer item is a printed media publication.

\* \* \* \* \*

UNITED STATES PATENT AND TRADEMARK OFFICE
CERTIFICATE OF CORRECTION

| | | |
|---|---|---|
| PATENT NO. | : 7,236,949 B2 | Page 1 of 1 |
| APPLICATION NO. | : 10/227536 | |
| DATED | : June 26, 2007 | |
| INVENTOR(S) | : Ofra Natan et al. | |

It is certified that error appears in the above-identified patent and that said Letters Patent is hereby corrected as shown below:

Title page, Item (54) and col. 1, line 5, Title: replace "PEROID" with -- PERIOD --.

Column 7, Line 9, replace "store" with -- stored --.

Signed and Sealed this

Fourth Day of December, 2007

JON W. DUDAS
*Director of the United States Patent and Trademark Office*